United States Patent [19]

Fillman et al.

[11] 4,365,452
[45] Dec. 28, 1982

[54] LOADING DOCK CANOPY

[75] Inventors: Russell L. Fillman, Colorado Springs, Colo.; Young Z. Yoon, Indianapolis, Ind.

[73] Assignee: Woodford Manufacturing Company, Colorado Springs, Colo.

[21] Appl. No.: 270,227

[22] Filed: Jun. 4, 1981

[51] Int. Cl.³ .................. E04H 14/00; E04H 6/30; E06B 3/50; E06B 1/06
[52] U.S. Cl. .................. 52/173 DS; 52/455
[58] Field of Search ............. 52/173 DS, 455; 49/477, 49/475, 491, 498, 495, 493, 488, 462, 504, 381, 382, 383, 384, 385, 386, 387, 388

[56] References Cited

U.S. PATENT DOCUMENTS

| | | | |
|---|---|---|---|
| 3,230,675 | 1/1966 | Frommelt | 52/173 DS |
| 3,403,489 | 10/1968 | Frommelt et al. | |
| 3,538,655 | 11/1970 | Frommelt et al. | |
| 3,557,508 | 1/1971 | Frommelt et al. | |
| 3,653,173 | 4/1972 | Frommelt et al. | |
| 3,826,049 | 7/1974 | Frommelt | 52/173 DS |
| 4,003,170 | 1/1977 | Mellyn | 52/173 DS |

*Primary Examiner*—Price C. Faw, Jr.
*Assistant Examiner*—Eugene R. Washington
*Attorney, Agent, or Firm*—Zarley, McKee, Thomte, Voorhees & Sease

[57] ABSTRACT

A loading dock canopy comprising a frame having a top, opposite sides, an inner face, an outer face, and a center access opening adapted to be aligned with the loading access opening of the loading dock. The frame is of resilient construction to permit deflection thereof, and an elastic material covers at least the top of the frame, with suitable covering material extending over the sides thereof. Inner and outer vertical members comprise the sides of said frame. Spring means extend therebetween to hold said vertical members apart. Cables limit the relative movement of said vertical members. Hinge means at the top of the frame facilitate the deflective capabilities of said frame.

14 Claims, 8 Drawing Figures

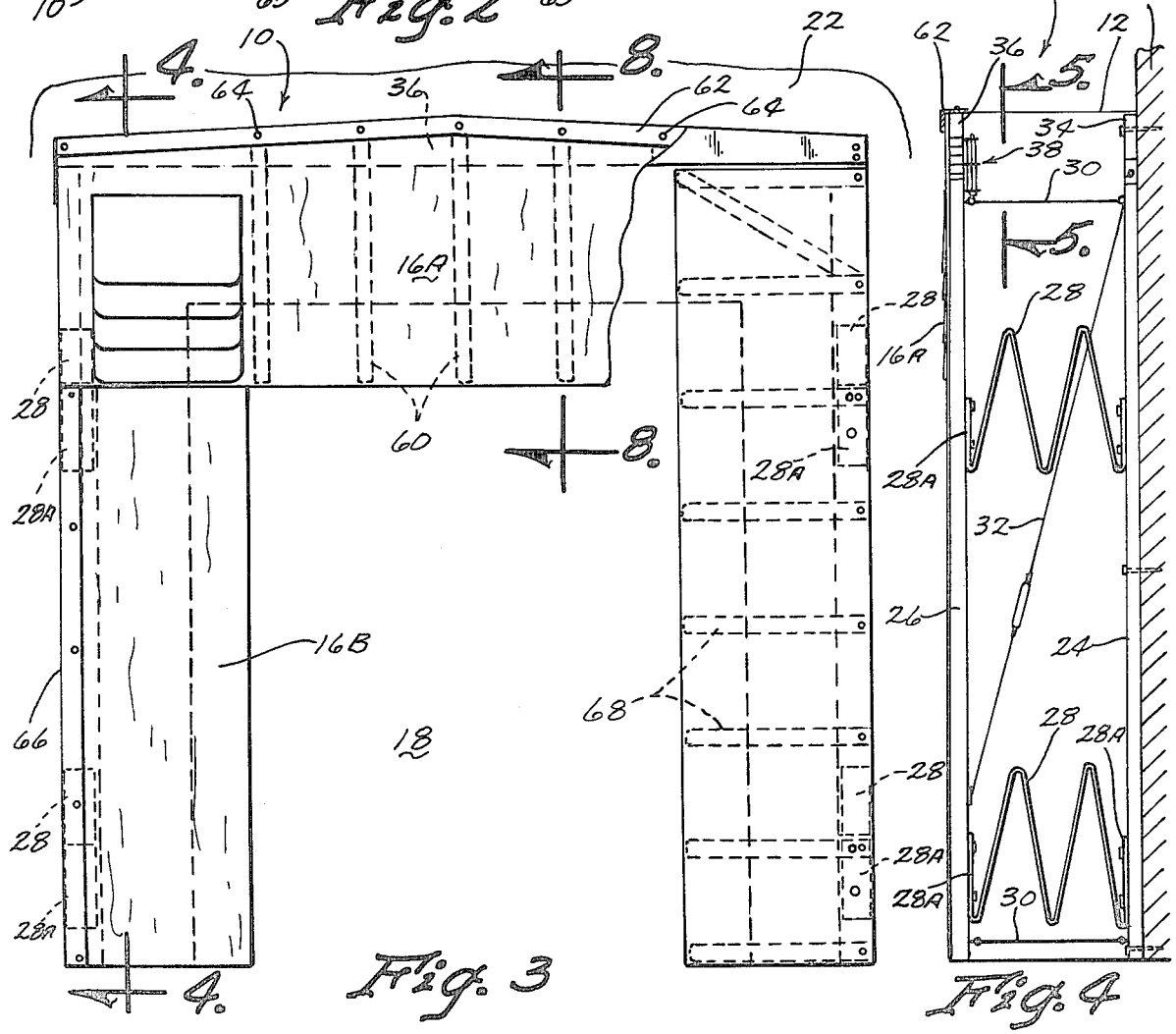

LOADING DOCK CANOPY

BACKGROUND OF THE INVENTION

Loading dock canopies are used to protect from weather the loading area between a dock opening and the vehicle being loaded or unloaded. Many prior canopies are not adaptable to varying types of compression caused by different truck positions. These canopies are subject to breakage, and often do not effectively seal the loading area from the weather.

SUMMARY OF THE INVENTION

A loading dock canopy is provided herein which is completely flexible and which is adapted to effectively seal the loading area despite being deflected in varying ways by varying truck positions. The dock canopy disclosed herein is resistant to damage because of its resilient construction.

A frame has top, sides, and a center access portion. Inner and outer vertical members separated by resilient springs comprise the sides. The top of the frame is hinged at its outer corner to facilitate the flexing of the frame. An elastic material covers the top so that stretching of the material can take place as required.

Cables are located within the frame to limit the relative movement of the frame members through the springs.

This canopy can therefore effectively seal itself against a truck body even if the truck body is not in accurate alignment with the access opening. The frame will flex and effectively seal itself, and will resist fracture despite deflection.

A BRIEF DESCRIPTION OF THE DRAWINGS

FIG. 1 is a perspective view of the device of this invention mounted on a truck loading dock;

FIG. 2 is a top plan view thereof shown at an enlarged scale with a portion of the cover being cut away to more fully illustrate the construction thereof;

FIG. 3 is a front elevational view thereof with a portion thereof cut away to more fully illustrate the construction;

FIG. 4 is a vertical sectional view thereof taken on line 4—4 of FIG. 3;

FIG. 5 is an enlarged scale detail of a hinge means taken on line 5—5 of FIG. 4;

FIG. 6 is a side elevational view of the hinge means of FIG. 5 taken on line 6—6 of FIG. 5;

DESCRIPTION OF THE PREFERRED EMBODIMENT

Figure 7:
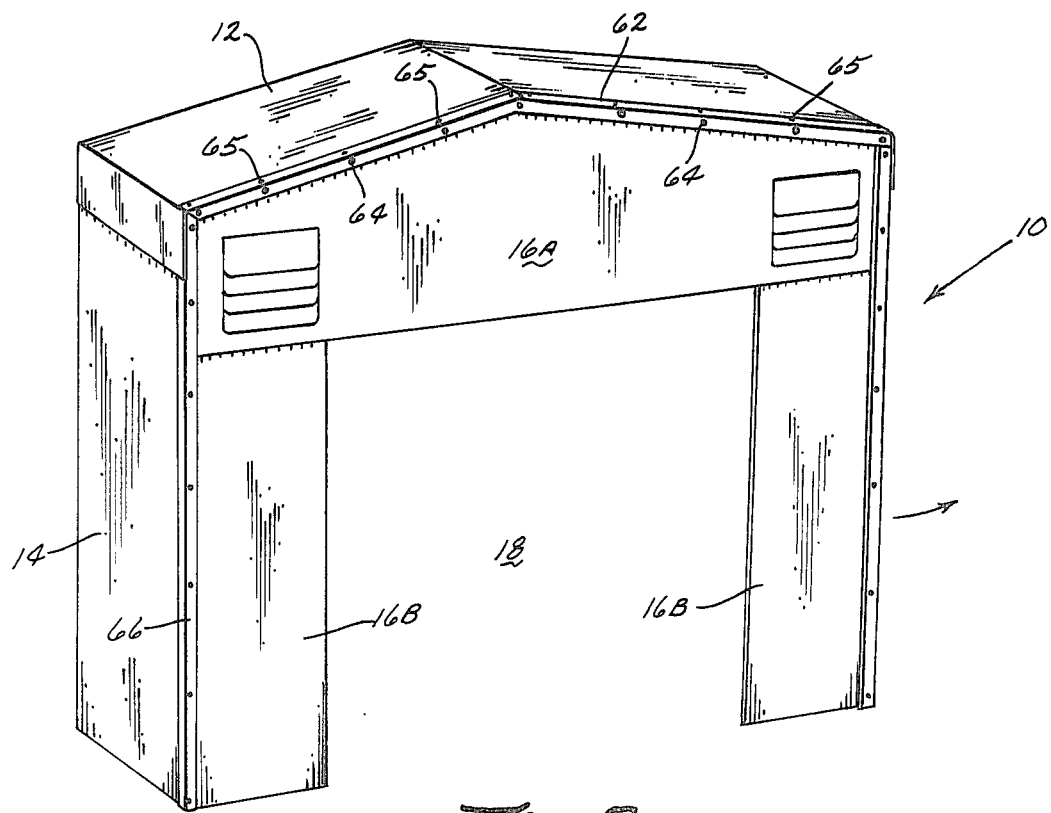
FIG. 7 is an enlarged scale perspective view thereof.

The FIG. 1 generally designates the canopy of this invention which is comprised generally of top 12, sides 14, top front portion 16A, and side front portion 16B. The material of top 12 should be an elastic stretchable material such as neoprene so that it can flex and deflect with the canopy as will be discussed hereafter. The material for the sides 14 and front portions 16A and 16B can be of canvas or other desired material.

An access opening 18 is located in the front portion of the canopy 10 and is adapted to be in alignment with the access opening 20 of a conventional loading dock or building 22.

With reference to FIG. 4 the canopy 10 includes two inner side members 24 which can be comprised of 2"×4" lumber. These members 24 are secured to the building 22 by lag bolts or the like. Outer vertical side members 26 are comprised of the same material and are located in the same plane as members 24. The members 24 and 26 at each side of the canopy are interconnected by compression springs 28. The springs are comprised of spring-like band material which are formed into a serpentine shape as best shown in FIG. 4. The upper vertical ends 28A of the springs are bolted or otherwise secured to the members 24 and 26.

The springs 28 normally tend to move member 26 outwardly from member 24. However, this outward movement of member 26 is restrained by cables 30 which are secured by their ends through any convenient means to the members 24 and 26 (See FIG. 4). Any tendency of the weight of the member 26 to move downwardly and to sag with respect to member 24 through the resiliency of springs 28 is restrained by the diagonal cable 32 which is secured at its lower end to the lower portion of member 26, and is secured by its upper end to the upper portion of the member 24.

The top 12 of canopy 10 is framed by horizontally disposed members 34 and 36. These members can be made from 2"×8" lumber with the upper edges thereof being subjected to a diagonal cut to create a slight pitch to the top of the canopy. The inner horizontal member 34 is rigidly secured to the building 22 by lag bolts or the like. The outer horizontal member 36 is connected to the upper portions of members 24 and 26 by hinges 38.

The construction of a typical hinge 38 is best shown in FIGS. 5 and 6. One hinge is located at each end of the horizontal member 36. Each hinge includes a first U-shaped bracket 40 which is secured by bolts 42 to an end of the member 36. A second U-shaped bracket 44 is secured to the upper ends of each of the outer side members 26. This is accomplished by bolts 46. The brackets 40 and 44 are vertically aligned and separated by a washer 48.

A pin 50 extends through suitable apertures (not shown) in the two brackets and washer 48. Pin 50 is rigidly secured to bracket 44 by weldments 52. The upper end of the pin 50 extends through slot 54 in the upper portion of bracket 40. The slot 54 extends in a horizontal direction and is adapted to permit the pin to move laterally therein. A washer 56 is placed over the upper end of the pin 50 and a nut 58 is threadably secured on the upper end of the pin 50. The nut 58 is not tightened so as to restrict the movement of the pin with respect to the bracket 40.

Figure 8:
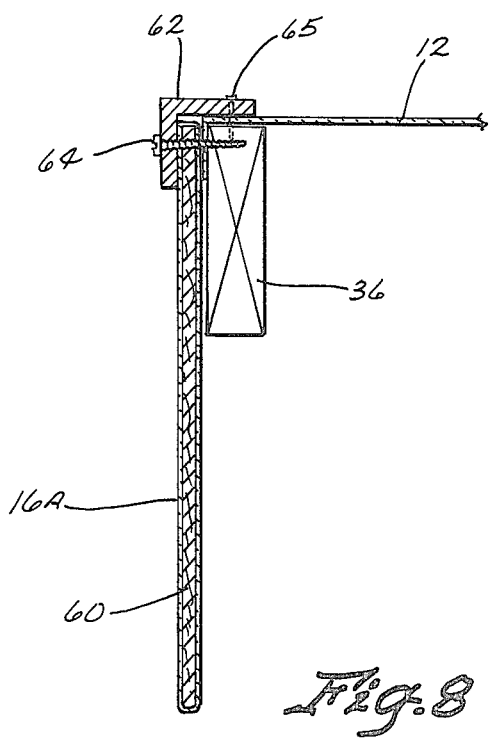
FIG. 8 is an enlarged sectional view taken on line 8—8 of FIG. 3.

Conventional, flexible, vertical stays 60 are positioned in conventional suitable pockets in the top front portion 16A as shown in FIGS. 3 and 8. As best shown in FIG. 8, the upper end of the stays 60 are secured to the member 36 by screws 64. Screws 64 extend through the stays 60, the upper edge portion of the top front portion 16A, and the outer edge portion of the top 12. Nails 65 extending through angle 62 secure the top 12 to the member 36.

Vertically disposed angles 66 are secured through and extend along the outside corner edges of the members 24. Suitable nails or screws extending therethrough secure the side front portions 16B and the sides 14 to the outer members 26.

Conventional horizontally elastic stays 68 are located in suitable pockets of the side front portions 16B as shown in FIG. 3. The outer ends of the stays are secured to the vertical outer members 26.

The opening 18 in canopy 10 is normally slightly smaller than the rearward end of truck 70. In operation, the truck 70 backs into the access opening 18 in alignment therewith. As the truck engages the side front portion 16B, the resilient springs 28 are compressed. The top front portion 16A and the side front portion 16B compress against the truck and effectively seal it against the effects of outside weather.

Obviously, the truck 70 is not always perfectly aligned with the opening 18, and the canopy is subjected to various deflecting stresses. The springs 28 accommodate most of this deflection. The hinge elements 38 help to maintain the integrity of the top 12 and prevent the vertical outer members 26 from breaking with respect to their attachment to the horizontal outer member 36. The vertical members 26 can pivot with respect to the horizontal member 36. Further, the vertical position of the members 26 can be varied by virtue of the slot 54 in the hinge 38 which permits a disalignment of the upper bracket 40 with respect to the lower bracket 44.

By providing a very elastic material for the top 12, the top is able to accommodate various distortions to which the canopy is subjected without tearing or becoming otherwise damaged.

From the foregoing, it is therefore seen that this invention will achieve at least its stated objectives.

We claim:

1. A loading dock canopy, comprising,
   a frame means adapted to be secured to a building around a loading access opening, said frame means having a top, opposite sides, an inner face adapted to be placed adjacent said building, an outer face located outwardly from said building, and a center access opening adapted to be in alignment with the loading access opening of said building,
   said frame means being of flexible construction and including resilient means to permit deflection thereof to a temporary skewed position,
   a covering material on the top and sides of said frame means, with the material on the top of said frame being of elastic material so that it can resiliently stretch as required when said frame means is laterally deflected,
   each side of said frame means including inner and outer vertical members, and
   said resilient means being connected to and extended between said inner and outer vertical members to resiliently hold said vertical members apart and to provide freedom of movement of each outer vertical member laterally of and toward and away from the inner vertical member on the same side of said frame means.

2. The loading dock canopy of claim 1 wherein said resilient means comprises a pair of vertically spaced-apart compression springs on each side of said frame means.

3. The loading dock canopy of claim 2 wherein said frame means includes means to limit the extent to which said compression springs hold said vertical members apart.

4. The loading dock canopy of claim 2 wherein said frame means includes support means to prevent said outer vertical members from sagging downwardly with respect to said inner vertical members.

5. A loading dock canopy, comprising,
   a frame means adapted to be secured to a building around a loading access opening, said frame means having a top, opposite sides, an inner face adapted to be placed adjacent said building, an outer face located outwardly from said building, and a center access opening adapted to be in alignment with the loading access opening of said building,
   each side of said frame means including inner and outer vertical members,
   compression springs extending between said vertical members to resiliently hold said vertical members apart,
   a horizontal member extending over the upper portions of said outer vertical members,
   and hinge means connecting said horizontal member to the upper portions of said outer vertical members whereby said outer vertical members are capable of movement with respect to said horizontal member without moving said horizontal member.

6. The loading dock canopy of claim 5 wherein said outer vertical members are capable of pivotal movement with respect to said horizontal member.

7. The loading dock canopy of claim 5 wherein said outer vertical members are capable of pivotal movement about a vertical axis with respect to said horizontal member.

8. The loading dock canopy of claim 5 wherein each of said hinge means is comprised of a first bracket secured on the end of said horizontal member, and a second bracket secured to the upper portion of one of said outer vertical members, with said first bracket being mounted over said second bracket, a hinge pin secured to said second bracket and extending upwardly in pivotal relation through said second bracket.

9. The loading dock canopy of claim 8 wherein the upper end of said hinge pin extends through a laterally and horizontally extending slot in said first bracket to permit said hinge pin and said outer vertical member to tilt laterally with respect to said horizontal member.

10. A loading dock canopy, comprising,
    a frame means adapted to be secured to a building around a loading access opening, said frame means having a top, opposite sides, an inner face adapted to be placed adjacent said building, an outer face located outwardly from said building, and a center access opening adapted to be in alignment with the loading access opening of said building,
    each side of said frame means including inner and outer vertical members,
    and a pair of vertically spaced-apart compression springs connected to and extending between said vertical members on each side of said frame means to resiliently hold said vertical members apart,
    each compression spring having inner and outer ends and said outer end being movable vertically and laterally of and toward and away from said inner end.

11. The loading dock canopy of claim 10 wherein said springs are comprised of elongated spring material disposed in vertical planes in a serpentine configuration.

12. The loading dock canopy of claim 10 wherein said frame means includes means to limit the extent to which said compression springs hold said vertical members apart.

13. The loading dock canopy of claim 12 wherein said frame means includes support means to prevent said outer vertical members from sagging downwardly with respect to said inner vertical members.

14. The loading dock canopy of claim 10 wherein said frame means includes support means to prevent said outer vertical members from sagging downwardly with respect to said inner vertical members.

* * * * *